Dec. 1, 1959 G. F. KRATZ 2,915,101
ANTI-SKID DEVICE
Filed Jan. 22, 1958 2 Sheets-Sheet 1
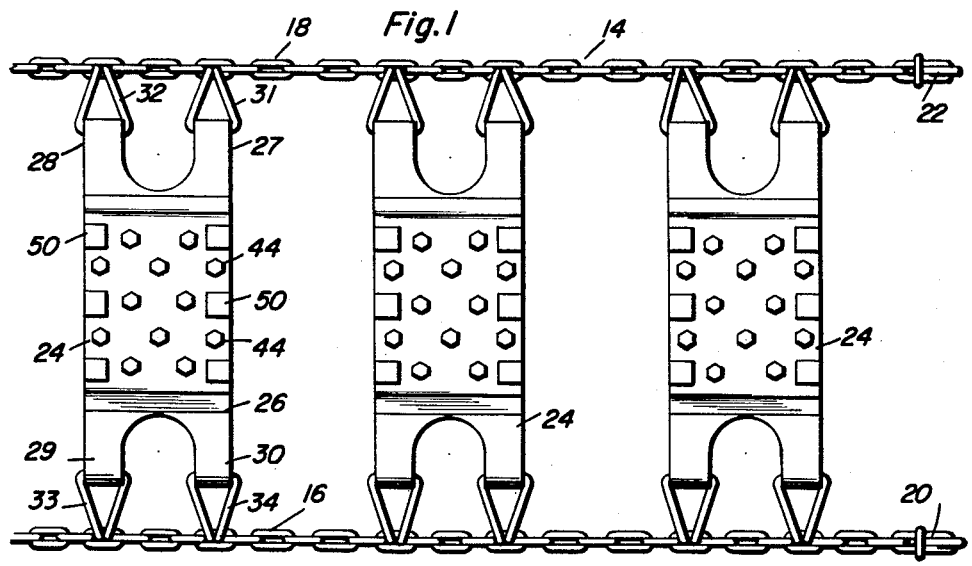
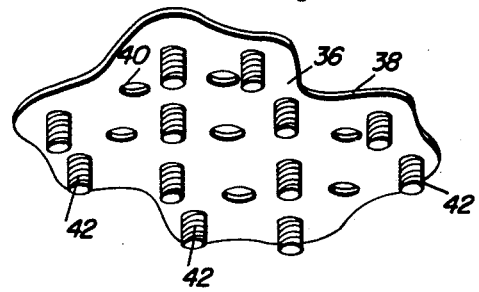
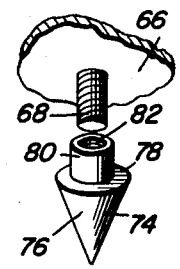
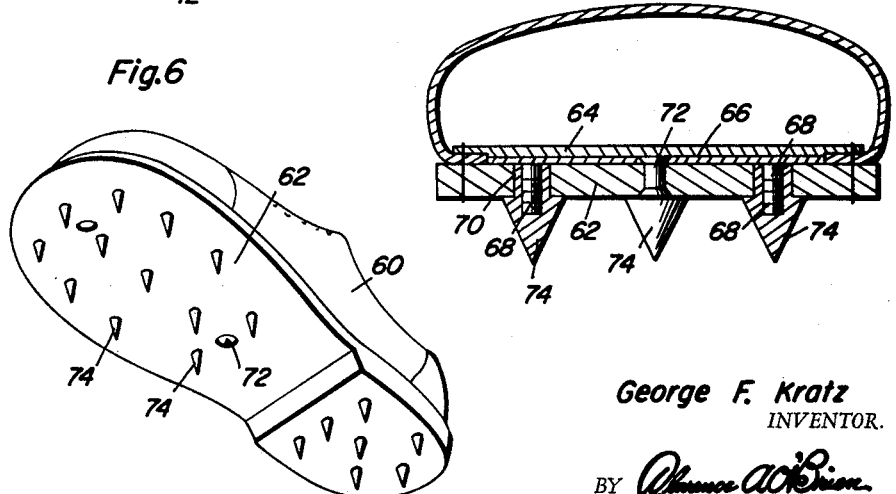
George F. Kratz
INVENTOR.

Dec. 1, 1959  G. F. KRATZ  2,915,101
ANTI-SKID DEVICE
Filed Jan. 22, 1958  2 Sheets-Sheet 2
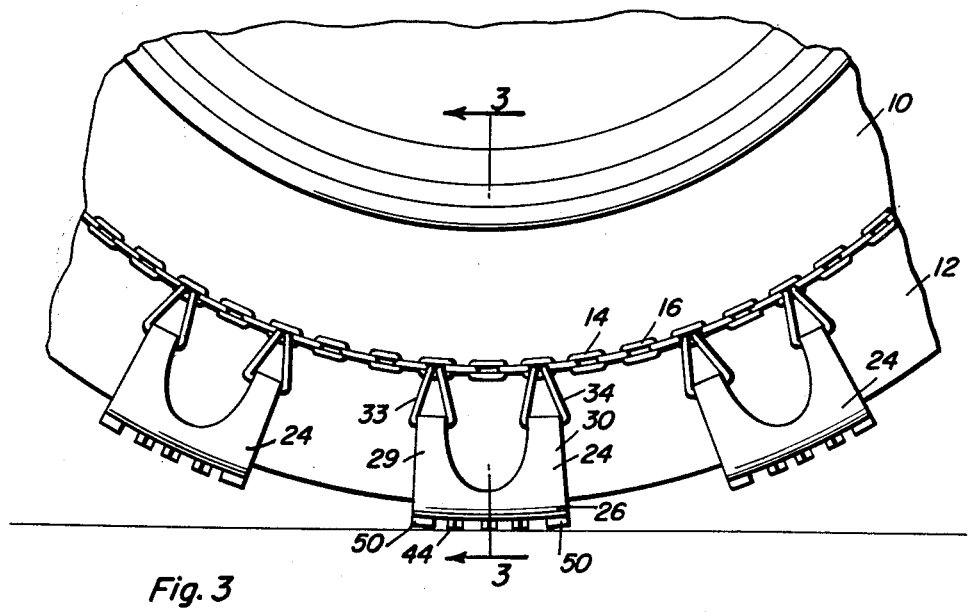
Fig. 2
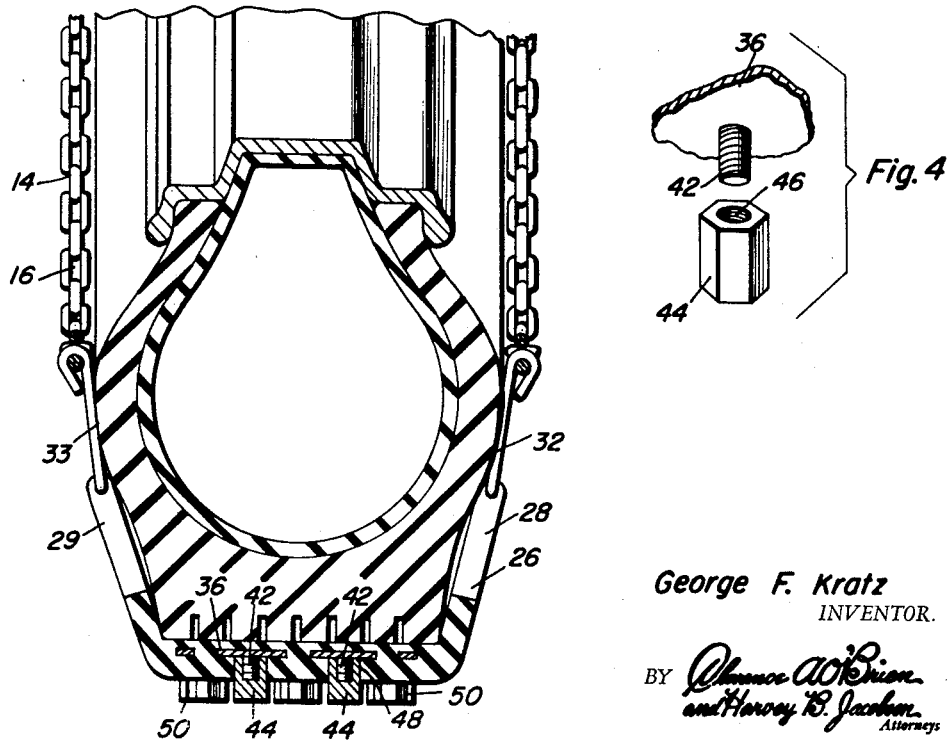
Fig. 3
Fig. 4
George F. Kratz
INVENTOR.

United States Patent Office 2,915,101
Patented Dec. 1, 1959

2,915,101

ANTI-SKID DEVICE

George F. Kratz, Portland, Oreg.

Application January 22, 1958, Serial No. 710,522

4 Claims. (Cl. 152—222)

This invention relates to anti-skid devices and more particularly to anti-skid devices to prevent slipping on ice, snow, mud or other slippery surfaces.

An object of the invention is to provide an anti-skid device which is embodied in an attachment for a motor vehicle wheel, a novel shoe or various other items. The anti-skid device has a metal plate as a foundation and onto which spikes, caulks or the like are fastened. In a motor vehicle anti-skid device the metal backing is embedded in a rubber panel whose ends are attached to chains on the vehicle wheel with the rubber panel functioning as a cross-tie between the chains. In the case of a shoe or overshoe, the metal backing is located behind the shoe sole and has studs on which caulks, cleats, etc. are separably fastened.

A further general object of the invention is to provide an attachment for motor vehicle wheels to prevent skidding of the vehicle or at least materially reduce the possibility of skidding, the device having a group of cross members that are made of rubber panels and in which the metal backing is molded or otherwise attached. The metal backing has studs on which cleats can be fastened. In addition there are rubber cleats molded on the rubber panel and which aid in establishing a grip when the vehicle is in use, but also serve the important function of reducing wear of the metal cleats and reducing the general noise level when, as almost always happens, the anti-skid device is riding on a clean surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary plan view of an anti-skid device constructed in accordance with the invention.

Figure 2 is a side view of a fragmentary part of an anti-skid device in Figure 1, this view showing it in use on a motor vehicle wheel.

Figure 3 is a transverse sectional view on an enlarged scale and taken on the line 3—3 of Figure 2.

Figure 4 is an exploded perspective view of one of the cleats that constitutes a part of the invention.

Figure 5 is a perspective view of a backing which is embedded in the rubber panel of Figure 3.

Figure 6 is a perspective view of a shoe embodying an anti-skid device in accordance with the invention.

Figure 7 is a transverse sectional view of the shoe in Figure 6.

Figure 8 is an exploded perspective view of one of the caulks or cleats in Figure 7 and the stud to which it is fastened.

In the accompanying drawings there is a motor vehicle wheel 10 fragmentarily illustrated. This wheel has a tire 12 on which anti-skid device 14 is disposed. The anti-skid device is made of two chains 16 and 18 that have locks 20 and 22 at their ends to attach the chains in a ring formation on the wheel 12. The cross-ties 24 take the place of the usual chain cross-ties that are commonly found in automobile anti-skid devices that are available. Each cross-tie is constructed identically. The cross-tie 24 is made of an elongate flexible panel 26, as rubber or some other elastomeric substance. The panel 26 is approximately rectangular with short arms 27, 28, 29 and 30 at the ends thereof and arranged in pairs. Links 31, 32, 33 and 34 are at the ends of the short arms and fasten to the chains 16 and 18. This attaches the panel 26 to opposed places on the two chains. Each of the cross-ties 24 are attached to the chains in the same manner.

The panel 26 has a stiff, preferably metal, backing 36 embedded in it between its upper and lower surfaces. The backing 18 is of irregular shape with the edges 38 wavy to establish irregular gripping along the edges thereof. By having the edges 38 irregular, there is a great lineal quantity of edge surface to enhance gripping action between the backing 36 and the panel 26. To further this end, there are a group of holes 40 in the backing through which the rubber is passed during the molding.

A plurality of studs 42, each of which is threaded, are attached to the backing 36 and protrude from one surface thereof. These studs are welded, cast, riveted, or otherwise rigidly fastened in place. Each has a cleat 44 threaded thereon. The cleats can assume a number of configurations, a preferred shape is shown in Figure 4. The cleat 44 is in the shape of a hexagonal short bar with a tapped bore 46 making it possible to thread the cleat on stud 42. A void or opening 48 is in the panel 26 around each stud 42 so that the cleat can be tightened against the metal surface of backing 36 with a part of the cleat protruding beyond the outer surface of panel 26. By having the hexagonal shape, the cleats are not only effective for gripping but can be easily applied and removed from the cross-tie 24.

An important feature of this invention is found in the group of cleats 50 on each cross-tie. Figure 1 illustrates six cleats 50, each of which is square, although this shape may be varied. Cleats 50 are made of the same substance as panel 26 and are of the same length as measured from the outer surface of panel 26, as the cleats 44. Cleats 50 are along the two outer edges of the panel 26 and they function to materially reduce wear of the metal cleats 44, especially on very hard surfaces, and to generally reduce the noise level of the anti-skid device.

Reference is now made to Figures 6–8. Footwear 60 which may be a shoe or an overshoe has a sole 62 and an insole 64, among other parts that are not detailed herein. Metal backing 66 is disposed between sole 62 and insole 64 and is of a shape generally to conform to the outline of the half-sole of footwear 60. The metal backing 66 has a group of studs 68 extending from one surface thereof and passed through openings 70 in the sole 62. Rivets 72 are shown attaching the metal backing 66 to the sole of the shoe, although other means in lieu of or in addition to the rivets 72 are contemplated.

Cleats 74 are separably attached to the studs 68. Each is of a special shape including a conical head 76 with a shoulder 78 at its wider end. The shoulder is adapted to contact the lower surface of sole 62 to establish a seal between the cleat and the opening 70 of the sole. The neck 80 of the cleat has a tapped bore 82 by which to attach it to the stud 68 and the neck is of such dimension as to fit reasonably snugly within the opening 70. When the sole 62 is made of rubber or some other elastomeric material, the functioning of the shoe sole 62 is very much like the functioning of the cross-ties 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anti-skid device for a motor vehicle wheel, said device including a pair of chains with locks at their ends and adapted to be fastened on the inner and outer faces respectively of the wheel tire, cross-ties between said chains, each cross-tie comprising a flexible panel having longitudinal edges, a rigid backing fixed to said panel, a plurality of threaded studs extending from one surface of said rigid panel, cleats attached to said studs, said flexible panel having openings in which said cleats are accommodated, and additional cleats on said flexible panel along the edges and located adjacent to the first mentioned cleats, the cleats along said edges of said flexible panel being more flexible than the others.

2. An anti-skid device for a motor vehicle wheel, said device including a pair of chains with locks at their ends and adapted to be fastened on the inner and outer faces respectively of the wheel tire, cross-ties between said chains, each cross-tie comprising a flexible panel, a rigid metal backing fixed to said panel, a plurality of threaded studs extending from one surface of said rigid panel, cleats attached to said studs, said flexible panel having openings in which said cleats are accommodated, additional cleats on said flexible panel adjacent to the first mentioned cleats, and some of said cleats being more flexible than the others.

3. The anti-skid device of claim 2 wherein said panel is generally rectangular with short arms protruding from the shorter ends thereof, and said means fastening said panel to said chains comprising links which are at the outer extremities of said short arms.

4. In an anti-skid device the combination of a rigid metal backing having a surface, a plurality of studs attached to said rigid metal backing and protruding at approximately right angles to said surface, a flexible panel connected with said rigid panel and having a plurality of apertures, metal cleats attached to said studs and located in said apertures with the cleats protruding beyond the level of the outer surface of said flexible panel, said flexible panel having at least two rows of rubber cleats integral therewith and completely spaced from the metal cleats and located along opposite edges of said flexible panel.

References Cited in the file of this patent

UNITED STATES PATENTS

| | | |
|---|---|---|
| 303,287 | Hunn | Aug. 12, 1884 |
| 1,306,334 | Gruber | June 10, 1919 |
| 1,617,729 | Varga | Feb. 15, 1927 |
| 1,884,283 | Schneider | Oct. 25, 1932 |
| 2,100,539 | Fritts | Nov. 30, 1937 |
| 2,310,467 | Schwab | Feb. 9, 1943 |
| 2,498,523 | Bergen | Feb. 21, 1950 |
| 2,632,491 | Eisner | Mar. 24, 1953 |